(12) United States Patent
Zhang et al.

(10) Patent No.: US 7,106,451 B2
(45) Date of Patent: Sep. 12, 2006

(54) FREQUENCY SPLITTING LASER MICROMETER

(75) Inventors: Shulian Zhang, Beijing (CN); Yan Li, Beijing (CN); Yingchun Ding, Beijing (CN); Jun Zhu, Beijing (CN)

(73) Assignee: Tsinghua University, Beijing (CN)

( * ) Notice: Subject to any disclaimer, the term of this patent is extended or adjusted under 35 U.S.C. 154(b) by 345 days.

(21) Appl. No.: 10/445,571

(22) Filed: May 27, 2003

(65) Prior Publication Data

US 2003/0231319 A1 Dec. 18, 2003

(30) Foreign Application Priority Data

May 31, 2002 (CN) ................. 02 1 20797

(51) Int. Cl.
*G01B 9/02* (2006.01)
(52) U.S. Cl. .................................... 356/487
(58) Field of Classification Search ........ 356/484–487, 356/488
See application file for complete search history.

(56) References Cited

U.S. PATENT DOCUMENTS

| | | | | |
|---|---|---|---|---|
| 3,409,369 A | * | 11/1968 | Bickel | 356/486 |
| 3,458,259 A | * | 7/1969 | Bagley et al. | 356/487 |
| 3,656,853 A | * | 4/1972 | Bagley et al. | 356/487 |
| 4,684,828 A | * | 8/1987 | Sommargren | 359/326 |
| 5,091,913 A | | 2/1992 | Zhang et al. | |
| 5,412,474 A | * | 5/1995 | Reasenberg et al. | 356/486 |
| 5,760,903 A | * | 6/1998 | Aimi et al. | 356/486 |
| 6,137,574 A | * | 10/2000 | Hill | 356/486 |
| 6,243,168 B1 | * | 6/2001 | Heflinger et al. | 356/486 |
| 6,724,486 B1 | * | 4/2004 | Shull et al. | 356/486 |
| 2003/0231319 A1 | * | 12/2003 | Zhang et al. | 356/640 |

FOREIGN PATENT DOCUMENTS

| | | |
|---|---|---|
| CN | 93114899.5 | 5/1995 |
| CN | 97120293.1 | 6/1998 |
| CN | 99103514.3 | 4/1999 |

\* cited by examiner

*Primary Examiner*—Hwa (Andrew) Lee
*Assistant Examiner*—Patrick Connolly

(57) ABSTRACT

A frequency splitting laser micrometer for measuring a displacement of an object. The laser micrometer includes a frequency splitting laser directing a first frequency splitting laser beam to the object via a laser output mirror at one end of the laser. The first laser beam is reflected thus outputting a second frequency splitting laser beam, such that a feedback cavity is created, wherein a frequency of the second laser beam is decided by a cavity length of said feedback cavity and accordingly the displacement of the object. A detecting and signal processing unit receives said first and second frequency splitting laser beams and measures the displacement of the object according to interference effects of said first and second laser beams.

16 Claims, 3 Drawing Sheets

RELATED ART

FREQUENCY SPLITTING LASER MICROMETER

FIELD OF THE INVENTION

The present invention relates generally to a laser micrometer. More particularly, the present invention relates to a frequency splitting He—Ne laser micrometer for measuring a displacement of an object.

BACKGROUND OF THE INVENTION

The principle of self-mixing interference has led to applications of self-mixing interferometers. The theory of self-mixing interference is as follows. When a portion of a laser beam is reflected by an external target back to a laser cavity, the reflected laser beam can have interference effect with the original laser beam inside the laser cavity. The laser output power can be modulated due to the interference effect. Such modulation is called self-mixing interference since the reflected laser beam is simply a reflection of the original laser beam. Because the reflected laser beam carries certain information of the external target, measurement of the laser output power can provide the information of the external target, such as velocity, surface and displacement, etc. Accordingly, such self-mixing interferometers have been used in different applications such as laser Doppler velocimeter, vibration detection, defect detection, and surface profile measurement, etc.

FIG. 1 is a front section view of a structure of a conventional laser self-mixing interferometer 10. Referring to FIG. 1, the laser self-mixing interferometer 10 includes a He—Ne laser discharge tube 12, a pair of laser cavity mirrors 14 and 16. The laser cavity mirrors 14 and 16 are attached to the laser discharge tube 12. Typically, a He—Ne laser including the laser discharge tube 12 and the laser cavity mirrors 14 and 16 can provide a He—Ne laser beam. Longitudinally disposed along the He—Ne laser are a photoelectric detector 18 and an object 20. The laser cavity mirror 14 allows 0.1%~0.3% of the laser beam to be transmitted to the photoelectric detector 18. The laser cavity mirror 16 (also called laser output mirror) allows 0.5%~1.5% of the laser beam to be transmitted to the object 20. The object 20 can be any shape, but must have a reflecting surface 22 to reflect laser beam back to the laser discharge tube 12. When there is a longitudinal displacement 24 of the object 20, the reflected laser beam and the original laser beam can have an interference effect inside the laser discharge tube 12. The photoelectric detector 18 receives the laser beams from the laser cavity mirror 14 and transfers the energy of the laser beams to an electric signal for displacement measurement.

FIG. 2 is a diagram showing the relationship between the displacement 24 and a laser intensity 26 that is detected by the photoelectric detector 18. Both theory and experiments have indicated that the laser intensity 26 changes an intensity period 28 when the displacement 24 changes a displacement period 30, which is a half of wavelength of the laser beam. An intensity curve 32 is similar to the curve of interferential fringe, though the intensity curve 32 is not an exact sinusoidal curve. Current research on self-mixing interferometer is based on such theory, and may choose semiconductor or $CO_2$ laser to provide laser beam.

However, there are a number of disadvantages to use such type of self-mixing interferometer. For example, such self-mixing interferometer can not decide the direction of the displacement 24 of the object 20 if the reflected laser beam is not extremely strong. In particular, the intensity curve 32 can not show whether the displacement 24 is directed to left or right. If the object 20 moves from left to right for a displacement period 30 and then from right to left for another displacement period 30 back to original position, FIG. 2 will give wrong result indicating two period displacement instead of correct result that is zero displacement. Although certain documents disclose that the displacement direction can be decided according to a triangle-like waveform under the situation that the reflected laser beam is particular strong, such method has failed for its unacceptable measurement errors.

Another disadvantage of the current self-mixing interferometer is that the current interferometer lacks subdividing ability. In particular, the current interferometer has low resolution and cannot distinguish a displacement shorter than a half of the displacement period 30.

SUMMARY OF THE INVENTION

A frequency splitting laser micrometer for measuring a displacement of an object is disclosed. In one embodiment, the laser micrometer includes a frequency splitting laser directing a first frequency splitting laser beam to the object via a laser output mirror at one end of said frequency splitting laser; a prism attached with the object receiving said first frequency splitting laser beam and transmitting said first frequency splitting laser beam to a reflecting mirror, said reflecting mirror reflecting said first frequency splitting laser beam thus outputting a second frequency splitting laser beam, such that a feedback cavity is defined by said laser output mirror, said prism, and said reflecting mirror, wherein a frequency of said second splitting laser beam is decided by a cavity length of said feedback cavity and accordingly the displacement of the object; and a detecting and signal processing unit receiving said first and second frequency splitting laser beams and measuring the displacement of the object according to interference effects of said first and second frequency splitting laser beams. In another embodiment, the laser micrometer includes a frequency splitting laser directing a first frequency splitting laser beam to the object via a laser output mirror at one end of said frequency splitting laser; a reflecting plate attached with the object reflecting said first frequency splitting laser beam thus outputting a second frequency splitting laser beam, such that a feedback cavity is defined between said laser output mirror and said reflecting plate, wherein a frequency of said second splitting laser beam is decided by a cavity length of said feedback cavity and accordingly the displacement of the object; and a detecting and signal processing unit receiving said first and second frequency splitting laser beams and measuring the displacement of the object according to interference effects of said first and second frequency splitting laser beams.

Other features and advantages of the present invention will be apparent from the accompanying drawings and from the detailed description, which follows below.

BRIEF DESCRIPTION OF THE DRAWINGS

The present invention is illustrated by way of example and not intended to be limited by the figures of the accompanying drawings in which like references indicate similar elements and in which.

DETAILED DESCRIPTION OF THE DRAWINGS

A frequency splitting laser micrometer for measuring a displacement of an object is disclosed. The frequency splitting laser micrometer uses a frequency splitting He—Ne laser to provide a laser micrometer having the ability of determining the direction of the displacement as well as having a high resolution power of 1/16 of the wavelength of the He—Ne laser beam.

Figure 1:
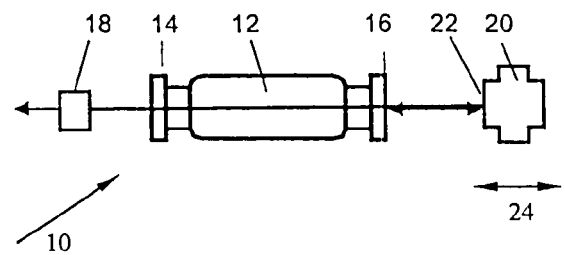
FIG. 1 is a front section view of a structure of a conventional laser self-mixing interferometer.
Figure 2:
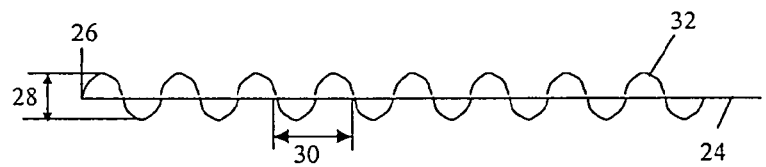
FIG. 2 is a diagram showing the relationship between a displacement of an object and a laser intensity.
Figure 3:
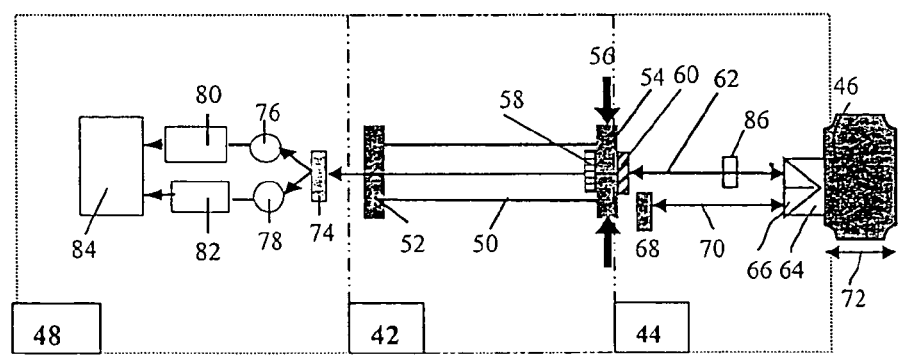
FIG. 3 is a front section view of a frequency splitting laser micrometer according to one embodiment of the invention.

FIG. 3 is a front section view of a frequency splitting laser micrometer 40 according to one embodiment of the invention. Referring to FIG. 3, the laser micrometer 40 includes a frequency splitting laser 42, a feedback cavity 44 between the laser 42 and an object 46, and a photoelectric detecting and signal processing unit 48.

In one embodiment, the frequency splitting laser 42 is a He—Ne laser. The He—Ne laser 42 includes a He—Ne discharge tube 50, a cavity mirror 52 at one end of the discharge tube 50, and a birefringence element 54. The He—Ne discharge tube 50 can provide a regular He—Ne laser beam. The cavity mirror 52 allows certain percentage of the He—Ne laser beam transmitted to the photoelectric detecting and signal processing unit 48. The birefringence element 54 can be a quartz crystal, a photoelastic birefringence element, a birefringence layer, a natural birefringence element, or an optical glassplate with an external force 56 exerting on the optical glass plate. In one embodiment, the birefringence element 54 is in a shape of circle wherein the external force 56 is exerted along with diameter direction. In another embodiment, the birefringence element 54 is in a shape of quadrate wherein the external force 56 is exerted along with the quadrate side direction. The birefringence element 54 provides a birefringence effect within the discharge tube 50. In one embodiment, we choose a quartz crystal tuning He—Ne double frequency laser source, which is detailed in U.S. Pat. No. 5,091,913 to Zhang et al. In another embodiment, we choose a birefringence double frequency laser to provide laser source, which is detailed in Chinese patent CN 97120293.1.

In particular, when there is a birefringence effect, the laser beam is split into two orthogonal frequency lights, namely o-light and e-light. The o-light and e-light have different frequencies or wavelengths, and the frequency difference of o-light and e-light can be decided by the birefringence element 54. Typically, we choose the frequency difference of o-light and e-light to be a range of 10 MHz to a few hundred million Hz. Detailed description regarding such birefringence effect is well known and is particularly disclosed in Chinese patents CN 99103514.3 and CN 97120293.1.

Typically, the birefringence element 54 is coated with an anti-reflecting layer 58 at one side and a reflecting thin film 60 at the other side. The reflecting thin film 60 allows certain percentage of laser beam transmitted out of the laser discharge tube 50. Thus, the birefringence element 54 together with the reflecting thin film 60 forms a laser output mirror in a conventional He—Ne laser. However, the frequency splitting laser 42 distinguishes itself that the laser 42 outputs a first frequency splitting laser beam 62 (including o-light and e-light).

Now referring to the feedback cavity 44, a prism frame 64 is attached with the object 46 and provides support for a prism 66. The prism 66 can be a pyramid prism or other kinds of prism. When the prism 66 receives the first frequency splitting laser beam 62, the prism 66 can transmit the first frequency splitting laser beam 62 into an opposite direction and direct the laser beam 62 to a reflecting mirror 68. The reflecting mirror 68 can reflect the first frequency splitting laser beam 62 back to the prism 66. Here we name the reflected laser beam by the reflecting mirror 68 a second frequency splitting laser beam 70 for distinction. The prism 66 then transmits the second frequency splitting laser beam 70 back to the laser discharge tube 50. It is known that if the reflecting mirror 68 is parallel with the reflecting thin film 60, the laser beam 70 can be transmitted back to the discharge tube 50 along the original path of the laser beam 62. In particular, as long as the reflecting mirror 68 is parallel with the reflecting thin film 60, incline or retortion of the prism 66 will not disturb the transmission of laser beam 70.

According to the definition of optics, the feedback cavity 44 (also called Fabry-Perot resonator cavity in optics) is defined by the reflecting thin film 60, the prism 66, and the reflecting mirror 68. One important parameter of the feedback cavity 44 is the cavity length L of the feedback cavity 44. Specifically, the cavity length L is the total distance of laser beam travelling in the feedback cavity 44, which is the cumulation of the distance between the reflecting thin film 60 and the prism 66, the distance of the laser beam travelling within the prism 66, and the distance between the prism 66 and the reflecting mirror 68. Optics theory has proved that the frequency of the second frequency splitting laser beam 70 is decided by the cavity length L. When there is a displacement 72 of the object 46, the cavity length L will change. Accordingly, the frequency of the second laser beam 70 is changed too. In particular, the output intensity of o-light and e-light of the second laser beam 70 is changed according to the displacement 72. After the second laser beam 70 travels back to the laser discharge tube 50, there is an interference effect between the second laser beam 70 and the first laser beam 62.

Now referring to the photoelectric detecting and signal processing unit 48, the detecting and signal processing unit 48 receives a certain percentage laser beam from the He—Ne laser 42 via the cavity mirror 52. When the first and second frequency splitting laser beams 62 and 70 have interference effects within the laser discharge tube 50, the unit 48 can detect such interference effects to measure the displacement 72. Typically, the unit 48 includes a polarized splitter 74, a pair of photoelectric detectors 76 and 78, a pair of electronic amplifiers 80 and 82 connecting with the photoelectric detectors 76 and 78 respectively, and a display device 84. The polarized splitter 74 receives laser beam from the cavity mirror 52 and can separate o-light from e-light. The photoelectric detectors 76 and 78 respectively change the intensities of o-light and e-light into voltage signals and the electronic amplifiers 80 and 82 amplify received voltage signals. The display device 84 received amplified voltage signals from the electronic amplifiers 80 and 82 and displays the voltage signal changes.

Accordingly, when there is a displacement 72 of the object 46, the wavelength L of the feedback cavity 44 will change. The frequency of the second frequency splitting laser beam 70 will change according to the wavelength L. The processing unit 48 will detect the interference effects of the first and second laser beams 62 and 70 and measure the displacement 72 according to the intensities of o-light and e-light after the interference of the first and second laser beams 62 and 70. Therefore, the laser micrometer 40 can measure the displacement 72 of the object 46. In one embodiment, an additional birefringence element 86 is disposed within the feedback cavity 44. The additional birefringence element 86 can be a quartz, a crystal or an optical glass plate with an external force. Experiments have indicated that the additional birefringence element 86 can double the resolution power of the laser micrometer 40.

Figure 4:
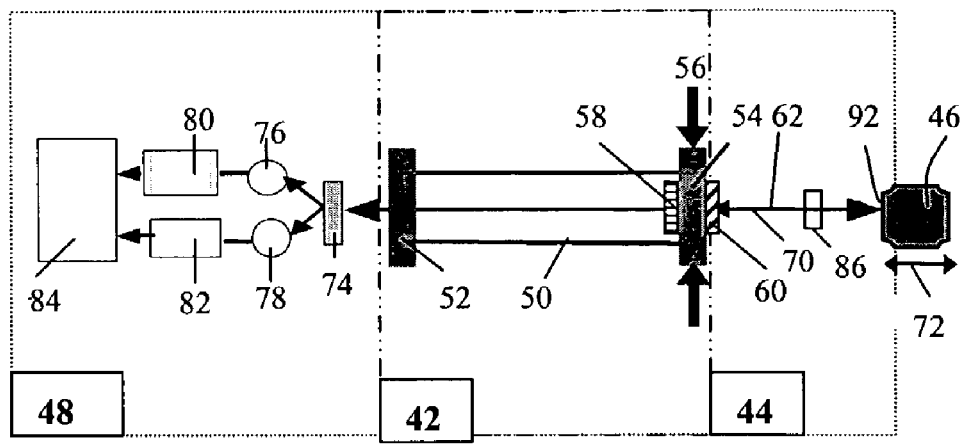
FIG. 4 is a front section view of a frequency splitting laser micrometer according to another embodiment of the invention.

FIG. 4 is a front section view of a frequency splitting laser micrometer 90 according to another embodiment of the invention. Comparing with FIG. 3, the laser micrometer 90 includes a reflecting plate 92 attaching with the object 46 instead of a prism and a reflecting mirror. According to the definition of optics, the feedback cavity 44 is defined by the reflecting thin film 60 and the reflecting plate 92, wherein the wavelength L of the feedback cavity 44 is the distance between the reflecting thin film 60 and the reflecting plate 92. For the same theory discussed in FIG. 3, the detecting and signal processing unit 48 can measure the displacement 72 of the object 46. Such structure of the laser micrometer 90 is particularly applied when the object 46 is relatively small, thin, or when it is difficult to fix a prism on the object 46. The reflecting plate 92 can be a piece of medium attaching with the object 46, a thin reflecting mirror coated by metal, a surface of paper with definite reflectivity, or just the surface of the object 46, as long as the reflecting plate 92 can reflect the first laser beam 62 thus output the second laser beam 70 back to the discharge tube 50.

Figure 5:
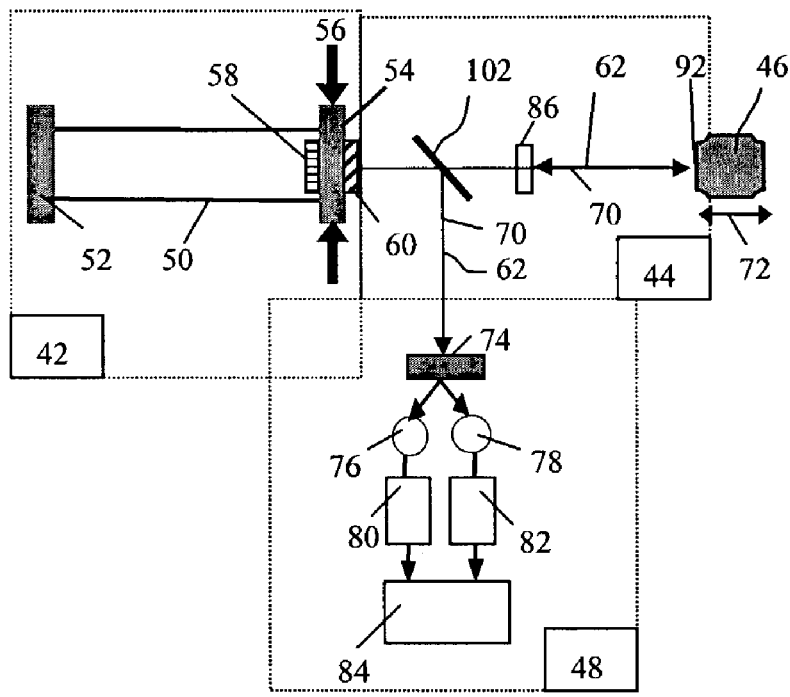
FIG. 5 is a front section view of a frequency splitting laser micrometer according to another embodiment of the invention.

FIG. 5 is a front section view of a frequency splitting He—Ne laser micrometer 100 according to another embodiment of the invention. Comparing with FIG. 3 and FIG. 4, the detecting and signal processing unit 48 in FIG. 5 receives the first and second laser beams 62 and 70 from a beam splitter 102 instead of from the discharge tube 50. The beam splitter 102 separates the first frequency splitting laser beam 62 into two parts. One part of the laser beam 62 travels to the unit 48 directly, and the other part of the laser beam 62 travels to the object 46 and is reflected back (said other part of the laser beam 62 becomes the second laser beam 70) to the unit 48. Again, the same theory discussed in FIG. 3 regarding the displacement measurement can apply to FIG. 5.

Figure 6:
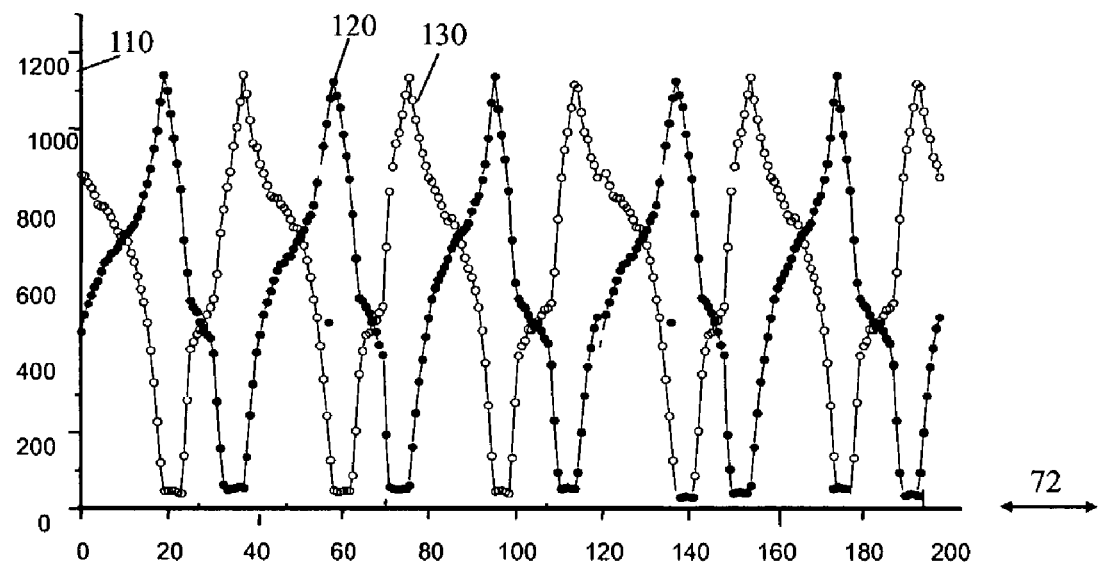
FIG. 6 is a diagram showing the relationship between a frequency splitting laser intensity and a displacement as described in FIGS. 3, 4, or 5.

FIG. 6 is a diagram showing the relationship between a frequency splitting laser intensity and the displacement 72 as described in FIGS. 3, 4, or 5. Specifically, transverse coordinate represents the displacement 72, and longitudinal coordinate represents an output intensity 110 of frequency splitting laser beams. Referring back to FIGS. 3, 4, and 5, when the first and second frequency splitting laser beams 62 and 70 have interference effect, the polarized splitter 74 can separate o-light from e-light and the display device 84 can display intensities of o-light and e-light respectively. A curve 120 shows the o-light intensity and a curve 130 shows the e-light intensity. The curves 120 and 130 show that intensities of both o-light and e-light change periodically according to the displacement 72.

Figure 7:
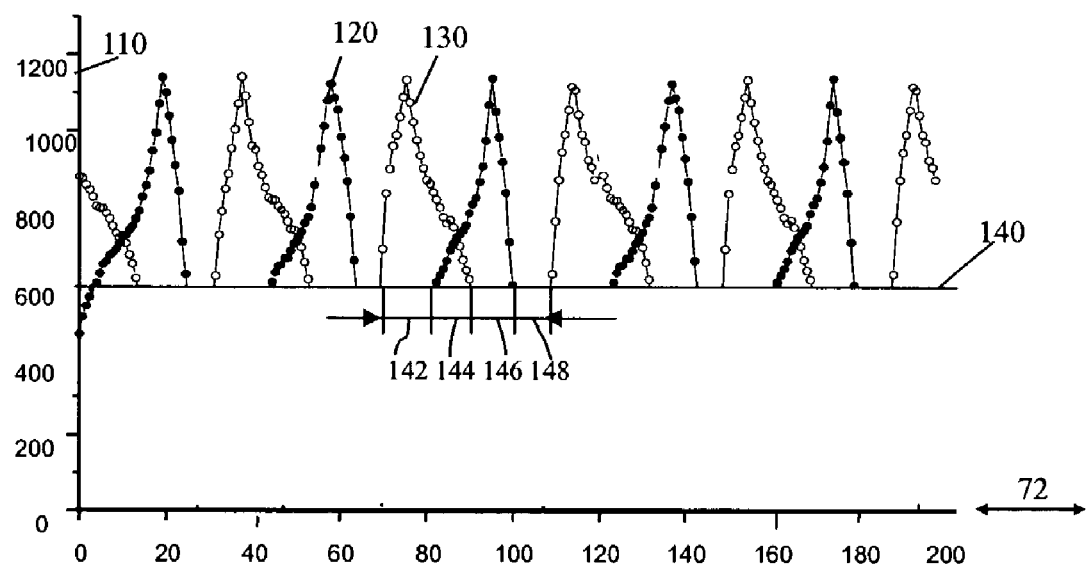
FIG. 7 is another diagram showing the relationship between the frequency splitting laser intensity and the displacement as described in FIGS. 3, 4, or 5.

Referring to FIG. 7, a threshold-voltage 140 is added to get rid of the intensity that is lower than the threshold-voltage 140. The threshold voltage 140 can be realized by the detecting and signal processing unit 48. Here four ranges are divided within a period of the displacement 72: an e-light range 142 representing a range that only e-light intensity is detected since only e-light intensity is above the threshold voltage 140, an e-light and o-light range 144 representing a range that both e-light and o-light intensities are detected, an o-light range 146 representing a range that only o-light intensity is detected since only o-light intensity is above the threshold voltage 140, and a no-light range 148 representing a range that no light is detected. These four ranges 142, 144, 146, and 148 are used to calculate the magnitude, direction, and subdivision of the displacement 72. In one embodiment, we use the o-light and e-light intensities that are higher than the threshold voltage 140. In another embodiment, we can use the o-light and e-light intensities that are lower than the threshold voltage 140 to reach same results.

It has been proved in Chinese patent CN 93114899.5 that the intensity of either o-light or e-light will change for a period if the displacement 72 in FIG. 4 or FIG. 5 is a half of He—Ne laser beam wavelength $\lambda$ such that the cavity length L is changed by $\lambda/2$. In FIG. 7, the total distance of range 142, 144, 146 and 148 are exactly one period, thus each appearance of either range 142, 144, 146, or 148 will indicate a displacement of $\lambda/8$. Therefore, the resolution power of the laser micrometer 90 or the laser micrometer 100 is $\lambda/8$, which is 79 nm if a 633-nm He—Ne laser is used. Referring back to FIG. 3, if the displacement 72 is $\lambda/4$, the cavity length L will be changed by $\lambda/2$, and the intensity of either o-light or e-light will change for a period. Thus the resolution power of the laser micrometer 40 is $\lambda/16$, which is 39.5 nm if the 633-nm He—Ne laser is used. Experiments also indicate that the additional birefringence element 86 may double the resolution power.

Furthermore, the direction of the displacement 72 can be decided by sensing the order of appearance of the four ranges 142, 144, 146, and 148. For example, if it starts at range 146 and the object 46 is moving towards the reflecting thin film 60, the intensity 110 will moving towards range 148. If the object 46 is moving away from the reflecting thin film 60, the intensity 110 will moving towards range 144. Therefore, this invention provides a laser micrometer and a method for detecting the direction of displacement as well as measuring the magnitude of the displacement with a high resolution.

Thus, a frequency splitting laser micrometer has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A frequency splitting laser micrometer for measuring a displacement of an object, said laser micrometer comprising:
   a frequency splitting laser directing a first frequency splitting laser beam to the object via a laser output mirror at one end of said frequency splitting laser;
   a prism attached with the object receiving said first frequency splitting laser beam and transmitting said first frequency splitting laser beam to a reflecting mirror, said reflecting mirror reflecting said first frequency splitting laser beam thus outputting a second frequency splitting laser beam, such that a feedback cavity is defined by said laser output mirror, said prism, and said reflecting mirror, wherein a frequency of said second splitting laser beam is decided by a cavity length of said feedback cavity and accordingly the displacement of the object; and a detecting and signal processing unit receiving said first and second frequency splitting laser beams and measuring the displacement of the object according to interference effects of said first and second frequency splitting laser beams.

2. The laser micrometer of claim 1, wherein said frequency splitting laser is a He—Ne laser.

3. The laser micrometer of claim 1, wherein said laser output mirror includes a birefringence element providing a birefringence effect, a reflecting thin film, and an anti-reflecting layer.

4. The laser micrometer of claim 3, wherein said birefringence element is a quartz crystal, a photoelastic birefringence element, a natural birefringence element, or an optical glassplate with an external force.

5. The laser micrometer of claim 1, wherein said first and second splitting laser beams each includes two orthogonal frequency lights.

6. The laser micrometer of claim 1, wherein said reflecting mirror is parallel with said laser output mirror.

7. The laser micrometer of claim 1, wherein said cavity length is decided by the displacement.

8. The laser micrometer of claim 1, further comprising an additional birefringence element within said feedback cavity.

9. The laser micrometer of claim 1, wherein said detecting and signal processing unit includes a polarized splitter, a pair of photoelectric detectors and a display device.

10. A frequency splitting laser micrometer for measuring a displacement of an object, said laser micrometer comprising:

a frequency splitting laser directing a first frequency splitting laser beam to the object via a laser output mirror at one end of said frequency splitting laser;

a reflecting plate attached with the object reflecting said first frequency splitting laser beam thus outputting a second frequency splitting laser beam, such that a feedback cavity is defined between said laser output mirror and said reflecting plate, wherein a frequency of said second splitting laser beam is decided by a cavity length of said feedback cavity and accordingly the displacement of the object; and a detecting and signal processing unit receiving said first and second frequency splitting laser beams and measuring the displacement of the object according to interference effects of said first and second frequency splitting laser beams.

11. The laser micrometer of claim 10, wherein said laser output mirror includes a birefringence element providing a birefringence effect, a reflecting thin film, and an anti-reflecting layer.

12. The laser micrometer of claim 10, wherein said first and second splitting laser beams each includes two orthogonal frequency lights.

13. The laser micrometer of claim 10, wherein said reflecting plate is parallel with said laser output mirror.

14. The laser micrometer of claim 10, wherein said reflecting plate is a piece of medium, a thin reflecting mirror, a surface of paper with reflectivity, or the surface of the object.

15. The laser micrometer of claim 10, wherein said cavity length is decided by the displacement.

16. The laser micrometer of claim 10, further comprising a beam splitter within said feedback cavity to separate said first frequency splitting laser beam into two parts.

* * * * *